(12) United States Patent
Ploechinger

(10) Patent No.: US 7,642,923 B2
(45) Date of Patent: Jan. 5, 2010

(54) SENSORS BASED ON DENSITY DIFFERENCES IN FLUIDS AND METHOD FOR OPERATING AND FOR MANUFACTURING SAID SENSORS TO DETECT MOVEMENT, ACCELERATION, POSITION, FLUID-PROPERTIES

(75) Inventor: Heinz Ploechinger, Freinberg (AT)

(73) Assignee: Heinz Ploechingev, Freinberg (AT)

( * ) Notice: Subject to any disclaimer, the term of this patent is extended or adjusted under 35 U.S.C. 154(b) by 430 days.

(21) Appl. No.: 11/161,314

(22) Filed: Jul. 29, 2005

(65) Prior Publication Data
US 2005/0279164 A1    Dec. 22, 2005

(30) Foreign Application Priority Data
Dec. 6, 2003 (DE) .................. 103 48 245

(51) Int. Cl.
G08B 17/12 (2006.01)
G08B 21/00 (2006.01)
G01P 15/00 (2006.01)

(52) U.S. Cl. .............. 340/600; 340/603; 340/657; 340/658; 73/514.01; 73/514.05; 73/514.08
(58) Field of Classification Search ............... None
See application file for complete search history.

(56) References Cited

U.S. PATENT DOCUMENTS

| 4,232,553 | A | | 11/1980 | Benedetto et al. |
| 4,945,768 | A | * | 8/1990 | Sorrells ................. 73/703 |
| 6,053,041 | A | * | 4/2000 | Sinha .................. 73/290 V |
| 6,925,891 | B2 | * | 8/2005 | Suginouchi et al. ...... 73/861.27 |
| 2003/0074953 | A1 | * | 4/2003 | Glaser et al. ............ 73/32 A |

* cited by examiner

*Primary Examiner*—Julie Lieu

(57) ABSTRACT

A sensor for detecting position and/or movement in space and/or for detecting fluid-properties comprising at least one transmitter and at least one receiver which are enclosed by a fluid, characterized in that the at least one transmitter generates cyclic fluid density fluctuations and the at least one receiver detects the change in transit time and/or the phase shift and/or the frequency change and/or the amplitude change.

8 Claims, 19 Drawing Sheets

2a

2b

2c

3a

3b

3c

Schnitt A

US 7,642,923 B2

SENSORS BASED ON DENSITY DIFFERENCES IN FLUIDS AND METHOD FOR OPERATING AND FOR MANUFACTURING SAID SENSORS TO DETECT MOVEMENT, ACCELERATION, POSITION, FLUID-PROPERTIES

BACKGROUND OF THE INVENTION

1. Field of the Invention

Thermally generated density differences in a fluid (e.g. in a gas) are already used in known sensors for detecting movement.

2. Description of the Related Art

U.S. Pat. No. 4,232,553, for example, discloses an arrangement for measuring angular acceleration by means of a fluid-filled toroid, where two opposing pairs of heating and sensor elements can detect a relative movement of the fluid with respect to the rotating toroid.

The German Patent of the applicant, DE 4243978 C1, filed on 23.12.92, describes an inclination and acceleration sensor which uses the convective flow in a fluid to obtain movement-dependent signals and can be manufactured using microsystems technology.

Movement of sensor elements in an isothermal field is also used in the sensor to detect a rotational movement or a rotational acceleration according to EP 1 111 395 A1.

The EP 0 674 182 B1 describes a hybrid-sensor, in which a gas is in a hermetically closed space. This sensor also uses thermal effects to detect acceleration and angular velocity. By an assembly of heat wire resistors the static distribution of temperature and the deviation of gas flow are detected.

In the sensors described it is taken as the starting point that a statically built-up isothermal field (i.e., a stable, nonturbulent convection flow) in a homogeneous fluid is displaced or altered by the movement. Since the measurement structures in these sensors must only adapt thermally (e-function), the reaction times are naturally relatively long and thus the applications are preferably to be seen in low-frequency measurement cycles.

In addition, a relatively high operating power is required to maintain the convection flow or the static isothermal field which further restricts the possible applications of these sensors.

The US 2003/0074953 A1 discloses a device for determining the change in density of a solid, liquid or gaseous medium. The device comprises a emission device and a receiving device coupled with the medium. The medium itself is not a component of the device. Transmitter, receiver and medium are spatially separated from each other and they should be aligned to each other in a certain position.

The measured changes in density of the medium are caused by physical and/or chemical effects. The transmitter itself did not generate them.

SUMMARY OF THE INVENTION

It is the object of this invention to create sensors to detect position and/or movement in space and/or fluid properties, in which the behavior of the temporal propagation of the density differences or density fluctuations in a box serves as measure. Furthermore methods for operating and for manufacturing said sensors should be disclosed. Low operating power, short reaction time and high resolution with a large measurement range as well as the possibility of an inexpensive and largely automated production are part of the object of the invention.

According to the invention, various methods for the operating mode, design variants of sensors and various manufacturing methods are used to solve this object.

The methods for operation are also suitable for operating already known sensors of the type described initially at lower operating power and higher measurement frequency.

Density fluctuation cycles at a frequency of 1 kHz or higher, for example, can be achieved by manufacturing the microsystems technology sensor according to the invention.

DETAILED DESCRIPTION OF THE PREFERRED EMBODIMENT

Figure 1:
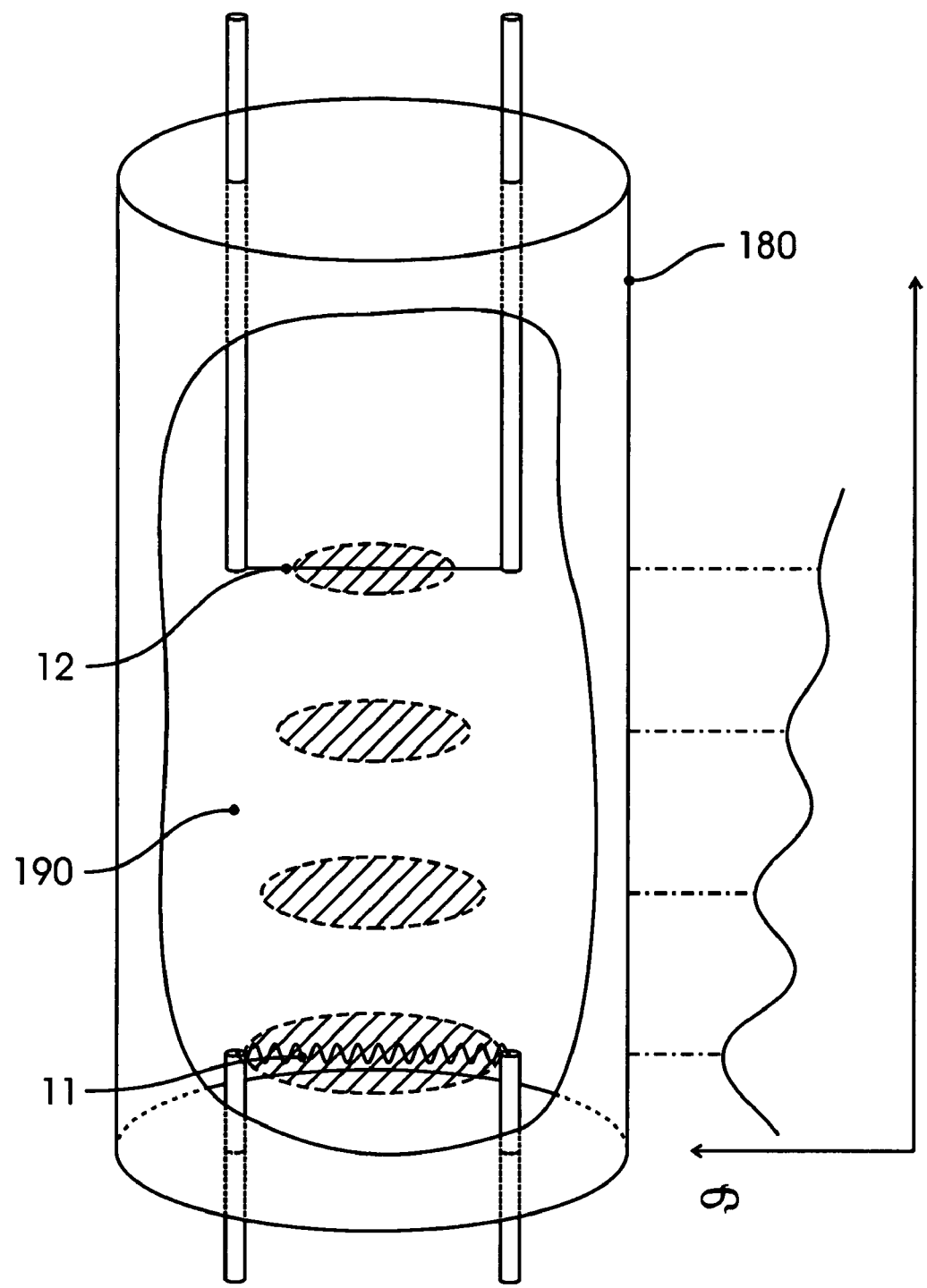
FIG. 1: Fluid-filled capsule with a transmitter and a receiver.

FIG. 1 shows modulated operation of the heater 11 (transmitter). The resulting density fluctuation propagates inside a fluid-filled capsule 180 towards the receiver 12.

According to the invention, transit times, transit time differences and amplitude differences of density fluctuations which propagate from a transmitter towards a receiver and in so doing are influenced by the position and by the movement state of the arrangement as well as by the properties of the fluid or the fluid mixture, are detected. In the "alternating component mode" according to the invention, the influence of drifting and offset values of transmitting and receiving elements can additionally be minimized. In addition, the expenditure required for adaptation can hereby be reduced.

Another new type of structural variant of sensors based on the evaluation of density differences is based on the knowledge that in principle it is also possible to use the stratification of two or more fluids having different density caused by the Earth's attraction to detect movement.

Figure 2:
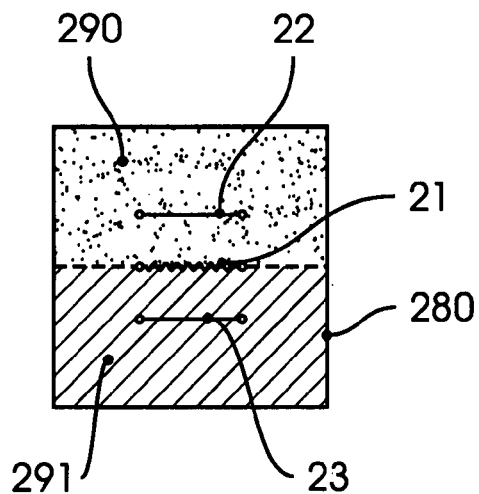
FIG. 2: Fluid-filled capsule with 2 fluids.
Figure 2:
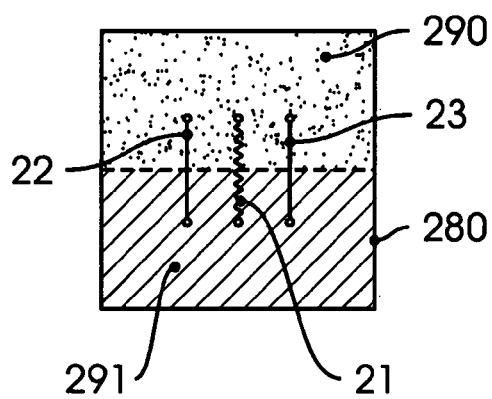
Figure 2:
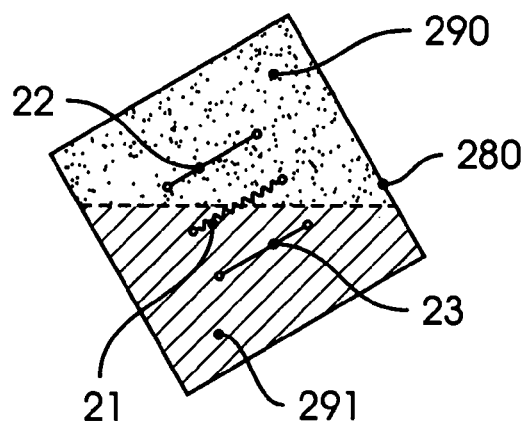

FIG. 2 shows a closed capsule 280 containing at least two different fluids 290 and 291. A heater 21 and two temperature sensors 22 and 23 are arranged inside the capsule, for example, parallel to one another, the sensors each being at the same distance from the heater.

The thermal conductivity or heat capacity of the at least two fluids should be different. If the heater is heated, for example, at constant power to a higher temperature level, the temperature gradient in the direction of the two sensors 22 and 23 is determined by the type of fluids and the influence of the acceleration due to gravity. Only when the sensor arrangement is vertical in the capsule, as shown in FIG. 2b, are the two sensors at the same temperature level. Deviating values can be assigned to a deviation of the position from the perpendicular.

In contrast to the prior art, in this case it is not necessary to build up a stable convective flow. The required operating power can thus be reduced considerably which is of considerable importance, for example, when these sensors are used in battery-operated devices (burglar alarms etc.).

If the thermal conductivity and/or heat capacity of the fluids are different, it also holds that a heat pulse emanating from the heater 21 reaches a certain identical temperature threshold value at sensor 22 and 23 at different times if a fluid A is located between heater 21 and sensor 22 and a fluid B is located between heater 21 and sensor 23.

These transit time differences can also be used as positional information.

If the fluid for filling the sensor capsule (or at least one of the filling fluids) is magnetic, the density distribution in the measurement space will be influenced both by the attraction of the Earth and also by an external magnetic field (e.g. the Earth's magnetic field). This property can be used in combination with the previously described methods and arrangements and also in combination with sensor variants and embodiments described hereinafter to obtain information on the position with respect to the perpendicular and orientation in the (Earth's) magnetic field.

The type and composition of the fluid or of fluid mixtures determine the propagation properties of density fluctuations, especially the transit time of a density fluctuation from the transmitter to the receiver. It is therefore appropriate to select the fluid or the fluid mixture and the filling pressure for movement sensors according to the invention differently according to the application. Possible criteria, for example, are: density, specific heat capacity, thermal conductivity, electrical and magnetic properties.

Especially for cyclically excited sensors, the elasticity of the fluid components or of fluid additives may also be important.

Since nanoparticles (fullerenes, buckyballs, nanotubes) are distinguished by particularly high elasticity and shape stability, these are also included among the range of possible filling materials or additives to capsule filling fluids.

Said thermal methods (temperature modulation) can be used as excitation (transmitters) for density fluctuations but it is also possible to consider sound, ultrasound, and density fluctuation generators such as membranes, tongues ("cantilever") excited, e.g. electrostatically, by bimetal or memory metal effects, piezo-oscillators, surface wave transmitters, etc. manufactured using microsystems technology or ceramic-based or glass-ceramic based (LTCC, HTCC) or also microfluidic switches (see page 366, W. Menz, Microsystem Technology).

Sensitive temperature sensors or sound recorders and pressure transducers, resonators etc. are used as sensors (receivers) to detect the cyclic signals influenced by superimposed movements and the position.

In the above descriptions a fluid or fluid mixture enclosed in a capsule was taken as the starting point. Detection of movement and position was of particular importance in this case. However, it is also possible to detect the type, composition and pressure of the enclosed fluid or fluid mixture by means of the density or heat capacity or thermal conductivity of the fluid or fluid mixture.

Corresponding arrangements in an open capsule (see FIG. 16) allow the "filling state" (pressure) and other properties (type, composition of fluid and fluid mixture) to be determined in applications with a predominantly quiescent operating mode, where density, heat capacity or thermal conductivity can again be used as the measure.

Figure 4:
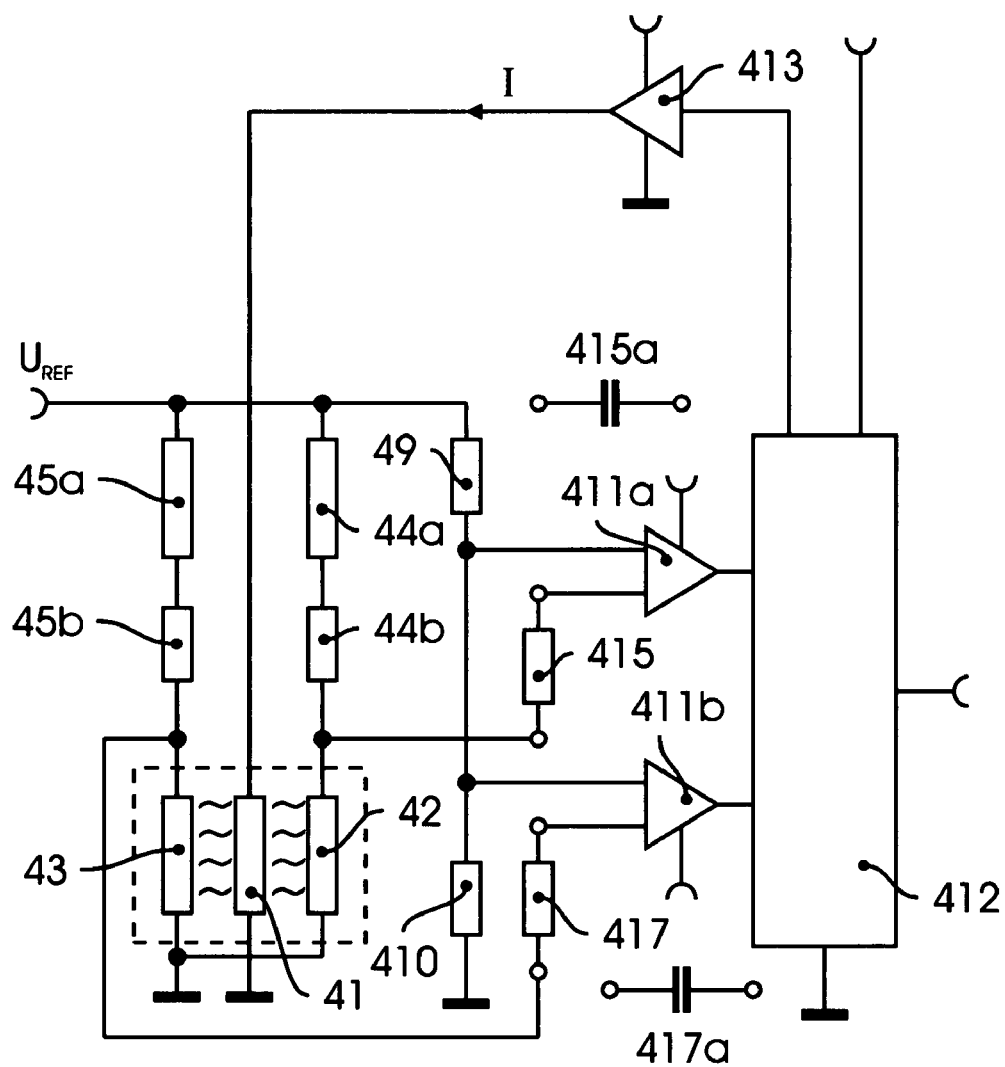
FIG. 4: Circuit diagram for 1 transmitter and 2 receivers.

Three methods are proposed for the cyclic operating mode of these sensors:

(1) The excitation element (transmitter) is acted upon at a predetermined fixed frequency or operated in pulsed mode with pulses of fixed duration and fixed time interval and the measuring element (receiver) detects the transit time caused by movement, phase shift, frequency change or amplitude change (see the circuit example in FIG. 4 for this)

Figure 5:
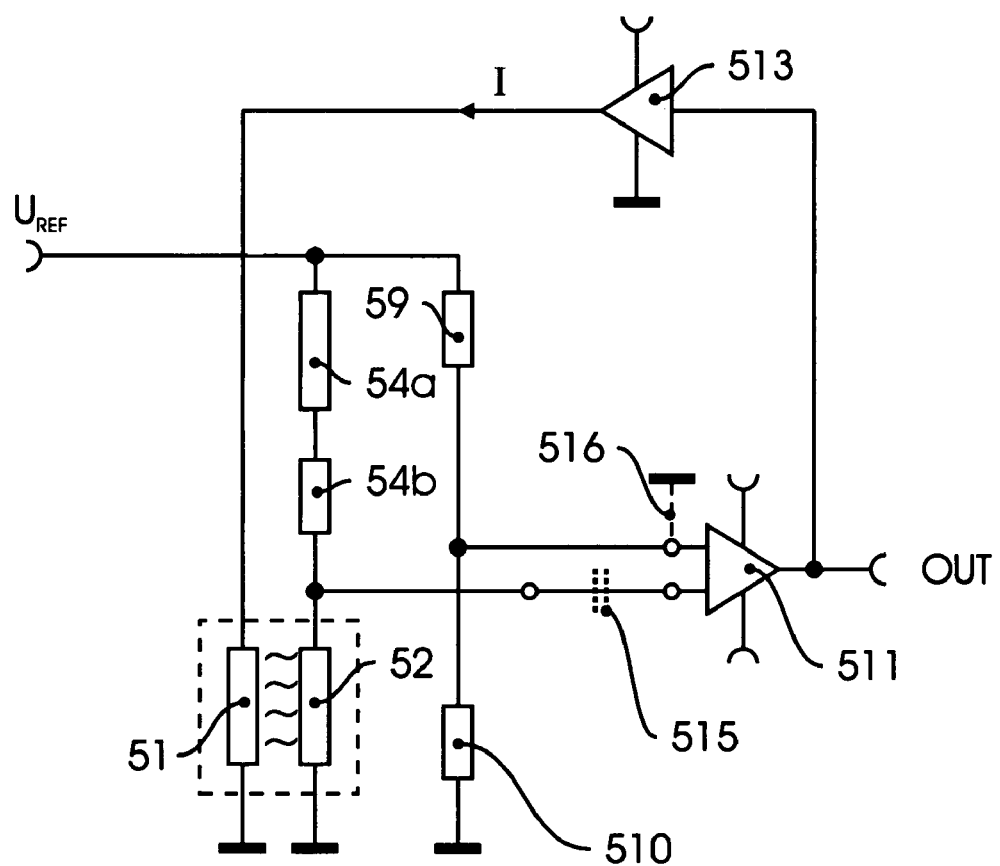
FIG. 5: Circuit diagram "Thermal Oscillator".

(2) The excitation element (transmitter) and measuring element (receiver) are switched together in a closed loop and a frequency or phase shift is established by itself which is related to the fixed internal transit and delay times and to influences from the movement of the sensor (thermal oscillator or density wave oscillator or sound wave oscillator; see FIG. 5 for this)

(3) In a closed loop comprising transmitter and receiver the frequency and/or amplitude of the density fluctuation is regulated at a constant level. The control variable for the subsequent regulation is a measure for the position and movement state of the arrangement.

When using this method, it is initially unimportant whether the propagation of the excitation for the density fluctuation takes place in all directions around the exciting element (transmitter) or specifically from the exciting (transmitter) to the measuring element (receiver). However, if the propagation is suitably directed, a higher measurement level at the measuring element (receiver) can be expected.

Sensors which are to image a movement in space (two- or three-dimensional) are preferably constructed without directional propagation since the "density packets" have all degrees of freedom, at least in the central area of the capsule and thus by means of suitable sensor structures, the change in position or movement can be detected without any influence.

On the other hand, directional propagation can be appropriate for sensors which are to detect linear or rotational movements or accelerations in a predetermined direction and plane.

For directional propagation, corresponding structures ("channels") can be already integrated in the microsystem (etching method in the sensor chip or in a silicon or glass cover wafer, joined together by the anodic bonding method). However, it is also possible to produce conducting structures in the course of the construction and connection technology, e.g., by selecting a multilayer LTCC or HTCC structure or corresponding printed circuit boards as chip carriers. In this case, separate exciting (transmitting) and measuring elements (receivers) can be used.

Figure 3:
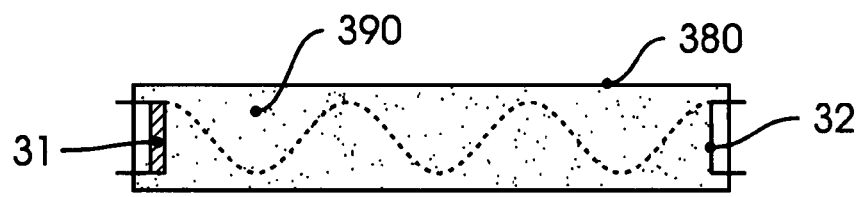
FIG. 3: Detailed description of wavelike propagation, linear, circular or spiral.
Figure 3:
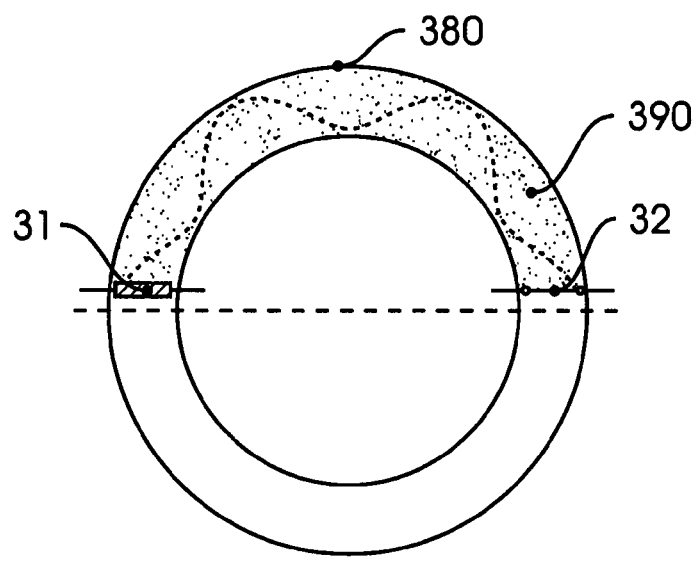
Figure 3:
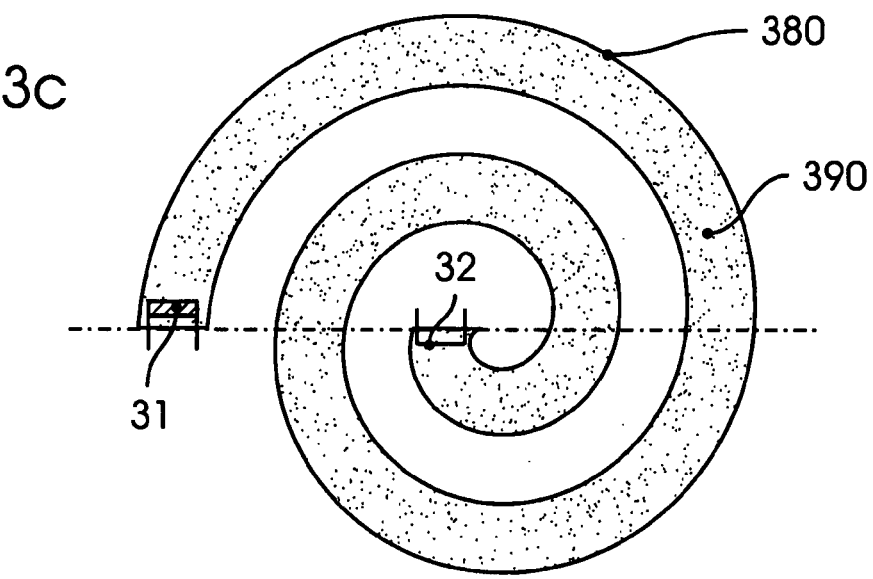

Depending on the desired sensor alignment, the conducting structures can be rectilinear (see FIG. 3a), circular or circular-segment-shaped (3b) or also spiral (3c). A sensor for rotational movement is constructed, for example, so that a sensor element (receiver) is arranged in the axis of rotation from where a spiral channel leads to an excitation element (transmitter) which is mounted at the outer end of the arrangement and the Doppler effect can thus be used to measure the rotation rate (see FIG. 3c).

The following variants are specified for the operating mode of the sensors according to the invention:

FIG. 4 shows a temperature-stable or temperature-dependent heater crosspiece 41 (transmitter) having low thermal inertia and two temperature-dependent sensor crosspieces 42 and 43 (receivers) also having the lowest possible thermal inertia.

The likewise temperature-dependent bridge resistances 44a and 44b as well as 45a and 45b are located in good thermal contact with the sensor support and thus the ambient temperature of the container for the transmitter-receiver arrangement. The resistances 44a and 44b and 45a and 45b can also be combined as one resistance each. The resistance values are appropriately selected so that 44a corresponds to the value of 42 and 45a corresponds to the value of 43. 44b should be a fraction of 42 and 45b a same fraction of 43 (in each case, at the same temperature).

This "fraction" determines the temperature difference between the ambient temperature and the average of the "thermal wave". The temperature coefficient of the temperature-dependent resistances is ideally the same.

49 and 410 are preferably the same temperature-stable bridge resistances, 411a and 411b are amplifiers or comparators, 412 is a microcontroller, 413 is a current, voltage or power source either having a constant output or an output according to a predeterminable (mathematical) function.

When the supply voltage (Uv, Uref) is switched on, the sensors 42 and 43 initially have the same temperature as the resistance 44a and 445b on the support (substrate) and thus the same value. A voltage lower than half the reference voltage is applied to the taps between 43 and 45b or between 42 and 44b, respectively since the "lengthening resistances" 44b and 45b are switched in series with the resistances 44a and 45a. However, half the reference voltage is applied at the tap between 49 and 410 if the value of 49 corresponds to that of 410.

Thus, the inputs of 411a and 411b are at different potentials. In the arrangement described this means that the outputs of 411a and 411b are at "low". For this state the microcontroller is programmed so that the source 413 is activated and thus the current I flows through the heater 41. This can be pulsed or obey a different function (for example, "sawtooth", "sine" etc.).

The resulting thermal wave (density fluctuation) propagates from 41 in all directions. The propagation depends on the properties of the fluid, the state of motion and the position of the arrangement with respect to the perpendicular.

In a horizontal arrangement and if the arrangement is at rest, the density fluctuation propagates uniformly. The sensors 42 and 43 are thereby also heated uniformly and reach the value of the resistances 44a+44b or 45a+45b after the same time.

At this point the same voltage (Uref/2) is applied at both inputs of 411a or 411b and the outputs of 411a and 411b simultaneously go to "high".

The microcontroller is programmed so that it evaluates the time difference between output 411a and 411b as a measure for the position. In the case described the time difference is zero and thus "horizontal position" is detected.

During a change in position or movement, the transit times of the density fluctuations vary. Since the sensors 42 and 43 are positioned in opposite directions, the transit time to one detector will be shorter than that to the other. The difference of the transit times (phase shift) is thus a suitable measurement signal for the position or movement. The sign of the difference gives the direction of the change in position or movement.

If both 411a and 411b have gone to "high" and thus a measured value is present, the source 413 is deactivated by the microcontroller. After a short cooling phase, 411a and 411b go back to "low". Depending on the desired measurement interval, a new measurement can be begun directly or after a specified time interval.

If 415 and 417 are replaced by capacitors 415a and 417a ("alternating component mode"; transmission of the alternating component of the density fluctuation), slow drifting of the average density or temperature level is not transmitted. In addition, influences from drifting of the density fluctuation generator (heater) as well as bridge offset voltages by resistance tolerances etc. can thus be minimized. The value ratio of 410 and 49 is suitably adapted for this purpose (e.g. 410=zero Ohm).

In sensors with thermopile measuring structures 42 and 43 are replaced by thermopiles and the bridge resistances are suitably redimensioned or 44a+b and 45a+b can be omitted. Here also coupling-in via capacitors ("alternating component mode") may be appropriate to reduce the influence of changes in value of the heating resistances.

For certain applications it may be sufficient to switch opposing sensor structures or structures offset by 90 angular degrees for example, in parallel or in series, to evaluate only the positive variation pulse at the amplifier 411 and thus obtain a signal which displays a movement independent of direction.

Figure 4A:
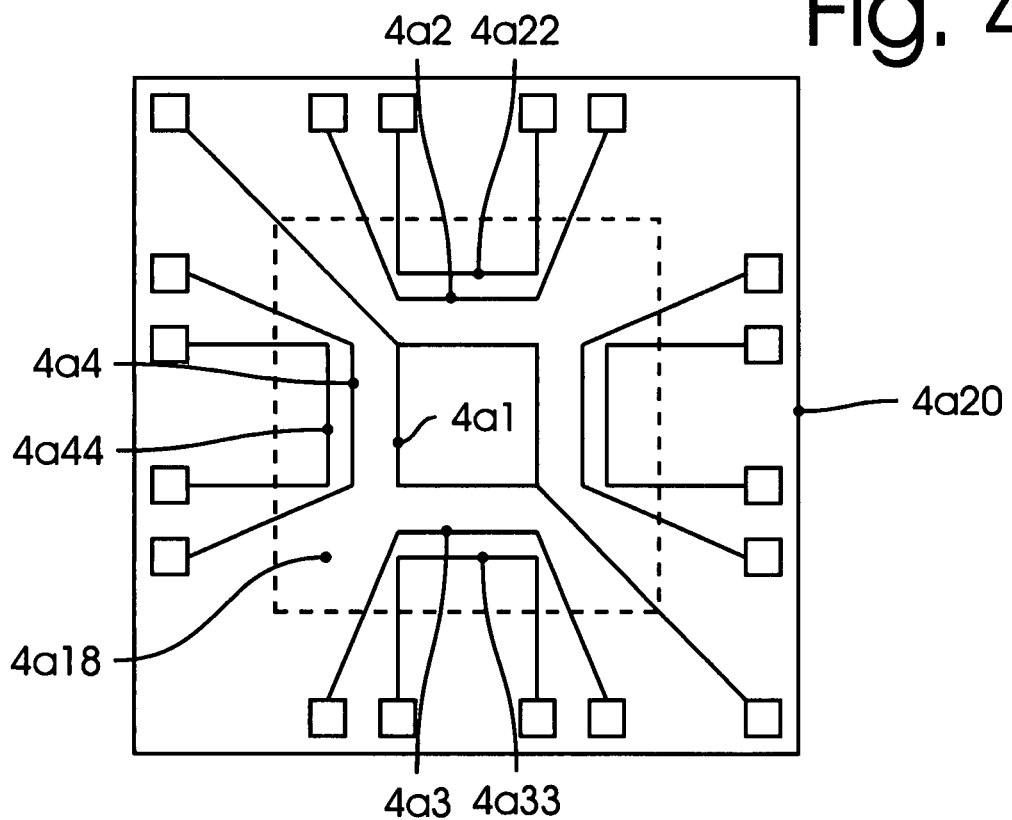
FIG. 4a: Exemplary embodiment of a sensor with a central transmitter.
Figure 4B:
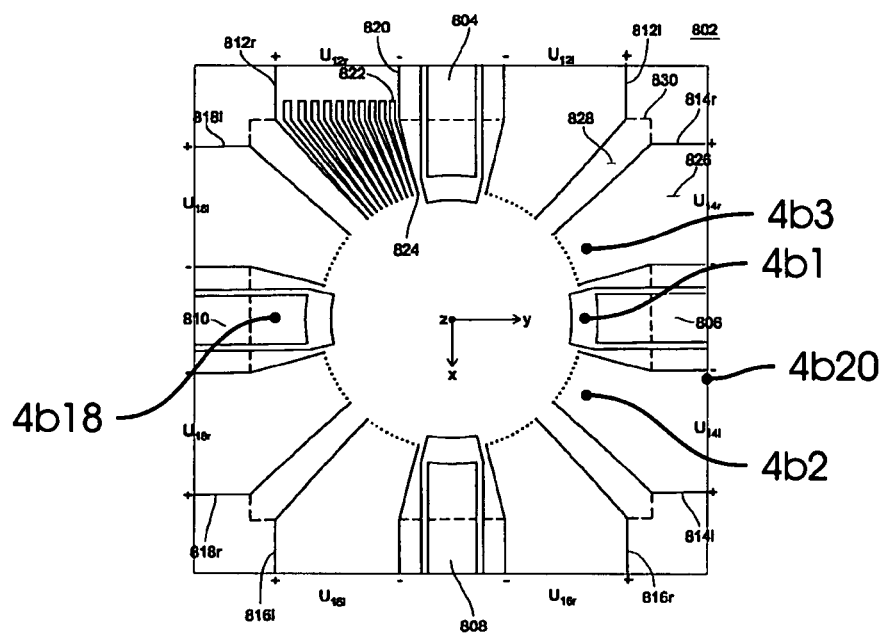
FIG. 4b: Exemplary embodiment of a sensor with decentralized transmitters.

The operating mode described previously can also advantageously be applied to sensors already belonging to the prior art, as for the sensors shown in FIGS. 4a and 4b, for example.

FIG. 4a shows a sensor with a central heater 4a1 which is arranged over an opening 4a18 in the support 4a20.

In accordance with the previous description, density fluctuations can be generated, for example, at the heater (transmitter) 4a1 whose transit time to and whose amplitude at the receivers 4a2 and 4a3 are determined and compared with one another to detect any positional change and movement of the sensor towards the axis of the receiver 4a2 and the receiver 4a3. A similar procedure can be carried out with the second axis offset by 90 angular degrees.

Since further receivers (4a22, 4a33, . . . ) are present at this sensor, which are located at different distances from the heater 4a1, information on position and movement can also be obtained by detecting the transit time difference and/or change in amplitude between receivers 4a2 and 4a22 or 4a3 and 4a33, respectively.

FIG. 4b shows a sensor for rotational acceleration or rate of rotation where four heaters (4b1=transmitter) are arranged in a circle. Four receiver pairs (4b2, 4b3, . . . ) are arranged above the opening 4b18 in the support 4b20, each symmetric with respect to the transmitters, and which consist of thermopile groups. At rest a cyclic density fluctuation generated at the transmitter 4b1 results in cophasal voltage fluctuations having the same amplitude at the receivers 4b2 and 4b3. When the arrangement is rotated about the axis z, a phase shift and amplitude difference occurs between the two said receivers.

If two or more of these systems from FIG. 4 (41, 42, 43, 44a+b, 45a+b, 49, 410, 415, 417, 411a+b, 413) are grouped in a linear series or on two or more segments of a circle (as in FIG. 4b, for example), where a microcontroller having a corresponding number of inputs is preferably used, a continuous or rotating controlled density fluctuation (thermal wave) can be generated.

If two of these complete systems are arranged on the same support in opposite directions, a signal free from disturbance variables can be obtained from the difference of the total periods.

Figure 4C:
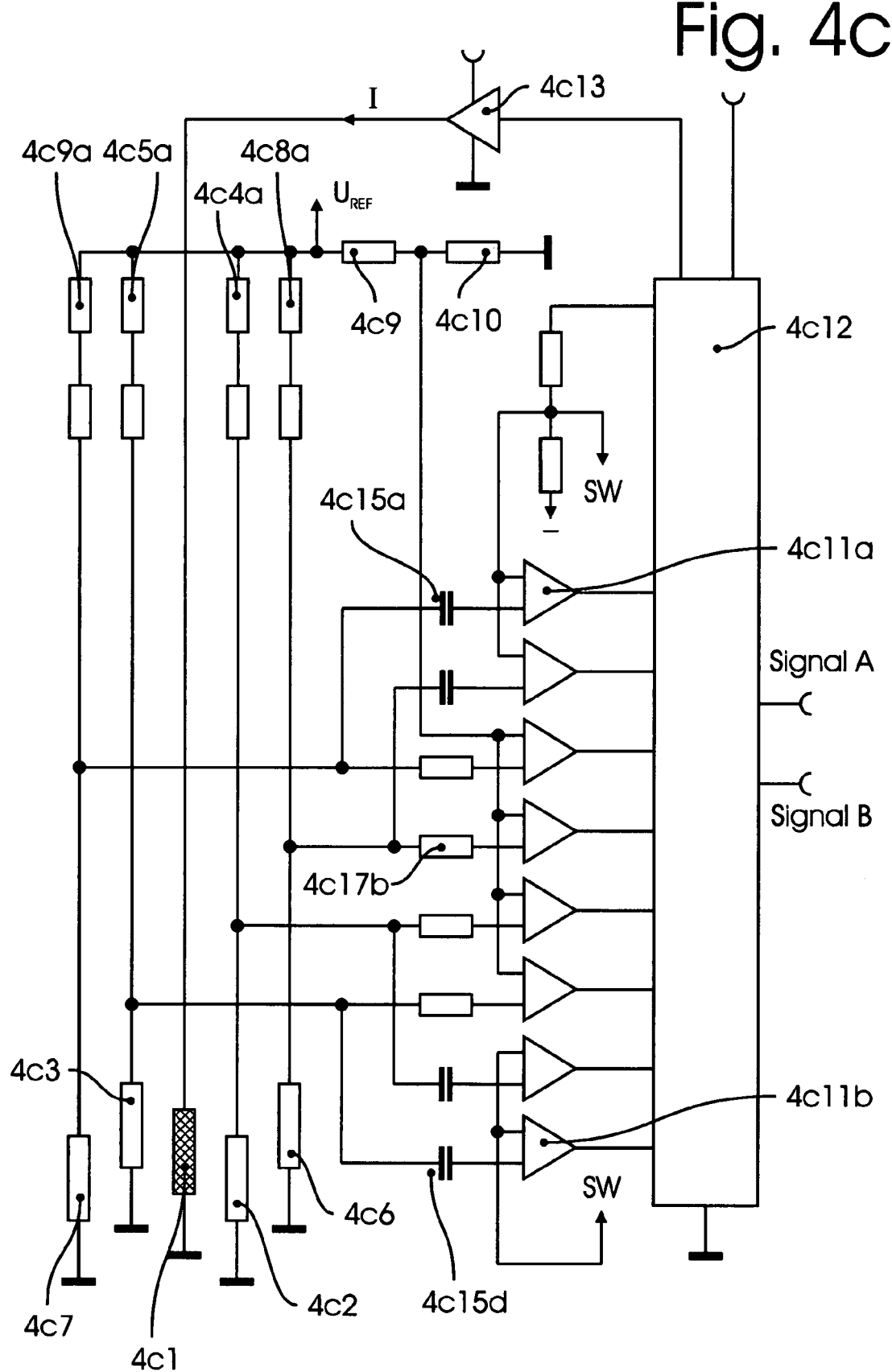
FIG. 4c: Circuit diagram for 1 transmitter and 4 receivers.
Figure 4D:
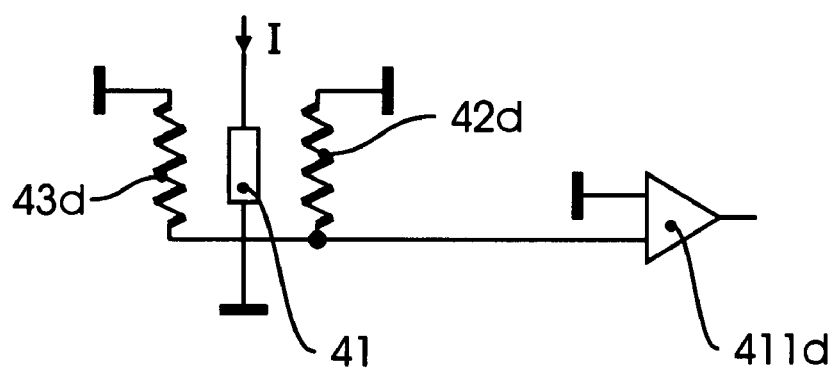
FIG. 4d: Thermopiles as receivers.

FIG. 4c shows an arrangement suitable, for example, for evaluating a biaxial inclination and acceleration sensor both with regard to its positional change in space and its respective acceleration using separate signals.

The heater (transmitter) 4c1 here stands for a central or a plurality of centrally distributed transmitters. The receivers 4c2, 4c3, 4c6, 4c7 can, for example, be pairs of receivers offset by 90 angular degrees (as in FIG. 4a) or however horizontally and vertically distant from the transmitter or group of transmitters.

4c4a, 4c5a, 4c8a, 4c9a are the bridge resistors which have already been described above, which are already combined here. The resistances 4c9 and 4c10 form a voltage divider to supply a reference voltage.

The receiver bridges are connected by means of the resistances 4a17a,b,c,d and by means of the capacitors 4c15a,b,c,d to eight amplifiers or comparators 4c11a to 4c11h. The reference input of the amplifier/comparators which receive a measurement signal via capacitors is preferably at ground or at the potential "SW".

After a density fluctuation wave has been generated by the transmitter or the group of transmitters, the group of comparators with capacitor input can detect the alternating component and the group of comparators with resistive input can detect the direct component and amplitude of the incoming density fluctuation wave. The microcontroller 4c12 determines the difference of the transit times up to the respective response thresholds and calculates therefrom signal A for the direct component and signal B for the alternating component.

In addition, the microcontroller cyclically controls the transmitter or the group of transmitters via the source 4c13.

FIG. 5 shows a "thermal oscillator" according to the invention.

The heater 51 (transmitter) and sensor structure 52 (receiver) each have low thermal inertia. At least the receiver element 52 is temperature-dependent. 54a and 54b are likewise temperature-dependent bridge resistances, where 54a has the same value as 52 and 54b represents the desired increase in temperature of the average thermal wave temperature level to the ambient temperature of the container (cold resistance x factor with corresponding temperature coefficient).

59 and 510 are resistances, e.g. having the same value (voltage divider 1:2). 511 is an amplifier, 513 is a controlled current, voltage or power source. When the supply voltage is switched on, the potential at the "+" input of the amplifier 511 is lower than that at the "−" input so that its output remains at "low" which brings about a current flow I through the heater 51 as a result of the inversion of the signal by the source 513.

A thermal wave (density fluctuation) propagates from the heater (transmitter) towards the sensor structure (receiver) where the propagation velocity depends both on the properties of the fluid (assumed to be constant here) and on the position and motion state of the arrangement.

If the thermal wave (density fluctuation) brings about an increase in temperature at the sensor structure, the difference of the input voltages at the amplifier 511 is reduced whereby the amplifier output becomes positive and thereby also reduces the output current I of the source 513. The reduced increase in heat, a corresponding inversion point and the subsequent reduction in heat in turn result in a corresponding density fluctuation with the opposite sign. This propagates towards the sensor structure with a transit time which depends on the position and motion state. By means of the signal reduction at the "+" input, this again results in an increased current flow.

The frequency and phase shift of this "thermal oscillator" can be used directly as a measure for the position and motion state of the arrangement. They are determined by the geometry of the sensor structure, properties of the fluid or fluid mixture and by the position and motion state and its variation principally in the direction/opposite direction of the heater (transmitter)-sensor structure (receiver) axis.

The variations at the sensor structure 52 can in turn be evaluated by means of the inserted capacitor 515 and the input of the amplifier 511 can be set to ground or a corresponding low potential (516) to use the "alternating component mode" to fade out offset and drift values.

If a microcontroller is used to evaluate the frequency and phase changes, it may also be appropriate to use this for sequence control, as shown in the following example: Start>defined number of oscillations (cycles)>time measurement of the duration for this complete number of cycles>output of values>pause>restart etc. According to the number of measured cycles, the resolution can be improved by assuming that the microcontroller has a smallest "time step" corresponding to the clock frequency below which it cannot go.

If separate values are to be determined for the x and y direction, e.g. to evaluate the known biaxial sensor TDNS (4a), it is sufficient to construct the wiring of the receiver 52 and amplifier 511 for each of the two directions and alternately switch the respective "direction" amplifier 511 to 513 according to a predetermined total number of cycles per microprocessor.

For applications such as detection of vibrations and burglar alarms, it can be sufficient to simply construct the vibration circuit with a heater and two parallel- or series-switched "direction" receivers (x and y) if it is sufficient to detect only the intensity of the movement in all directions and not a particular direction.

Figure 6:
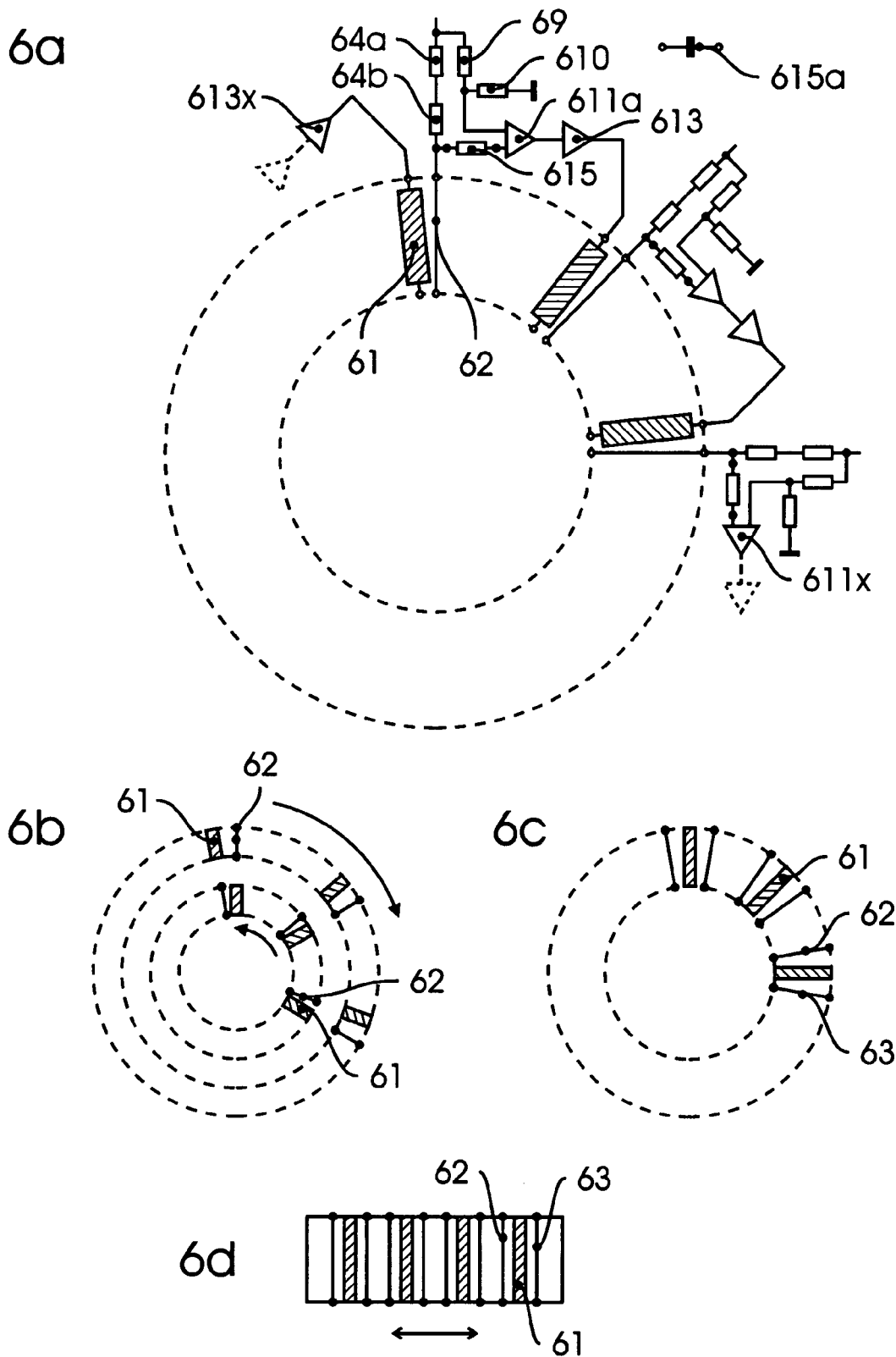
FIG. 6: Circulating or continuous density fluctuation waves.

FIG. 6 describes a method for using the previously described method for controlled or freely oscillating, rectilinearly continuous, circular or spirally rotating density fluctuation waves.

61, 61x are heaters (transmitters), 62, 62x are sensor structures (receivers), 64a+b, 69, 610 are bridge resistances, 615 is a resistance, 615a is a capacitor, 611a, 611x are amplifiers or comparators, 613a, 613x are current, voltage or power sources.

When the heater (transmitter) 61 is heated, the density fluctuation propagates in the direction of the sensor structure (receiver) 62 depending on the position and motion state.

When the rise criterion is reached at 62, the next nearest heater (transmitter) is activated etc., so that a continuous or revolving density fluctuation or thermal wave is obtained. Several types of operating mode and evaluation are possible:

6a: The repetition frequency or frequency of gyration in continuous operating mode (613x directly starts 61 again etc.); time measurement for one revolution, then pause.

6b: two oppositely directed density fluctuation waves are generated on a support. The difference in the frequencies or the periods represents a signal, e.g. for a rotational movement which is already largely free from perturbing influences (position etc.).

6c shows a combination of the two systems from 6b. A microcontroller identifies at which of the two receivers 62 or 63 the rise criterion is reached first and starts the revolution in this direction.

6d shows a corresponding arrangement for linear motion.

Both principles can be transferred to other forms of density fluctuations where suitable excitation (transmitting) and measuring structures (receiver) of corresponding type can be used instead of the heater (transmitter) and sensor structure (receiver) for temperatures.

Another possible operating mode consists in switching transmitting-receiver structures in series or in parallel so that the respective receiver structures cooperate, for example, in the clockwise direction of rotation, likewise as a mirror image in the counterclockwise direction of rotation, thereby form an average in each case and thus perturbing influences (inclination etc.) are largely compensated.

Figure 7:
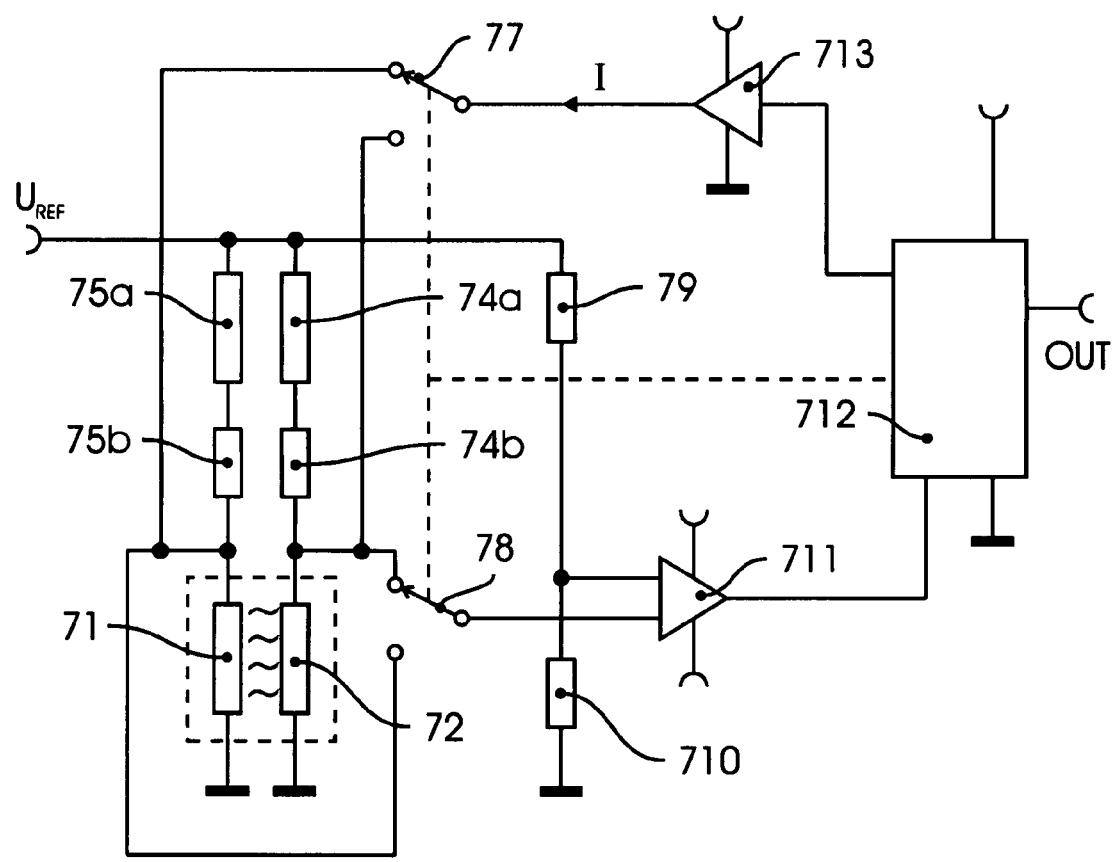
FIG. 7: Circuit diagram with transmitter and receiver, assembled in the same way, which could be switched over.

The arrangements can then be operated with a single circuit as in FIG. 4, 5 or 7.

In FIGS. 7, 71 and 72 each simultaneously represent heater (transmitter) or sensor structures (receiver) where, in addition to the same resistance and the same temperature coefficient, the same geometry and the same low thermal inertia are also assumed.

74a and 74b are also temperature-dependent partial resistances having the same value as the resistances 71, 72 (at the same temperature and the same temperature coefficient) but lying on the substrate and thermally well connected to the same.

75a and 75b are "lengthening resistances" having the same value, equal to a fraction of 71 or 72, likewise thermally well connected to the substrate. These resistances determine the temperature difference between the ambient temperature (container or support) and the average value of the "thermal wave".

77 and 78 are electronic changeover switches, coupled to one another, 79 and 710 are voltage dividers, preferably 1:2,

711 is a sensitive amplifier/comparator,

712 is a logic circuit, possibly a microcontroller,

713 is a current, voltage or power source with constant output or output following a (mathematical) function.

In the switch position shown 71 is heated by current I. A lower voltage is initially present at the measurement input of the comparator 711 than at the reference input (tap between 79 and 710) since the cold resistance of 72 is smaller than the sum of 74a+74b.

If the density fluctuation (thermal wave) generated by 71 reaches the structure 72 and thereby increases its resistance until R 72=R 74a+R 74b, the comparator 711 tilts and thereby triggers switching off the current 1 and switching over the switches 77 and 78. Since 71 is still heated and thus R 71>R 75a+R 75b, the comparator remains tilted until 71 cools to R. 71=R 75a+75b. Tilting back the comparator 711 at this point triggers the current flow I through 72. 71 initially cools further until the density fluctuation (thermal wave) triggered by 72 reaches 71, the structure 71 is heated again and when R 71=R 75a+R 75b, the comparator tilts again, the current is switched off, the switches switch over etc.

The process is now repeated continuously, the structures 71 and 72 alternately being heater (transmitter) and sensor (receiver). The ratio of the switch-on times of 71 and 72 is a measure for the influences acting on the arrangement such as inclination, acceleration, rotational acceleration, rate of rotation etc.

Depending on the desired measurement rate, a certain number of cycles can be preset in the microcontroller, the time ratio after the total time has elapsed for this number of cycles can be determined and output, a pause inserted and a new measurement cycle only then started again.

In order to use the "alternating component mode", a capacitor is inserted after the switch 78, for example.

Multiple transmitter-receiver arrangements where transmitter and receiver have the same structure can also be suitably combined to compensate for perturbing influences.

Figure 8:
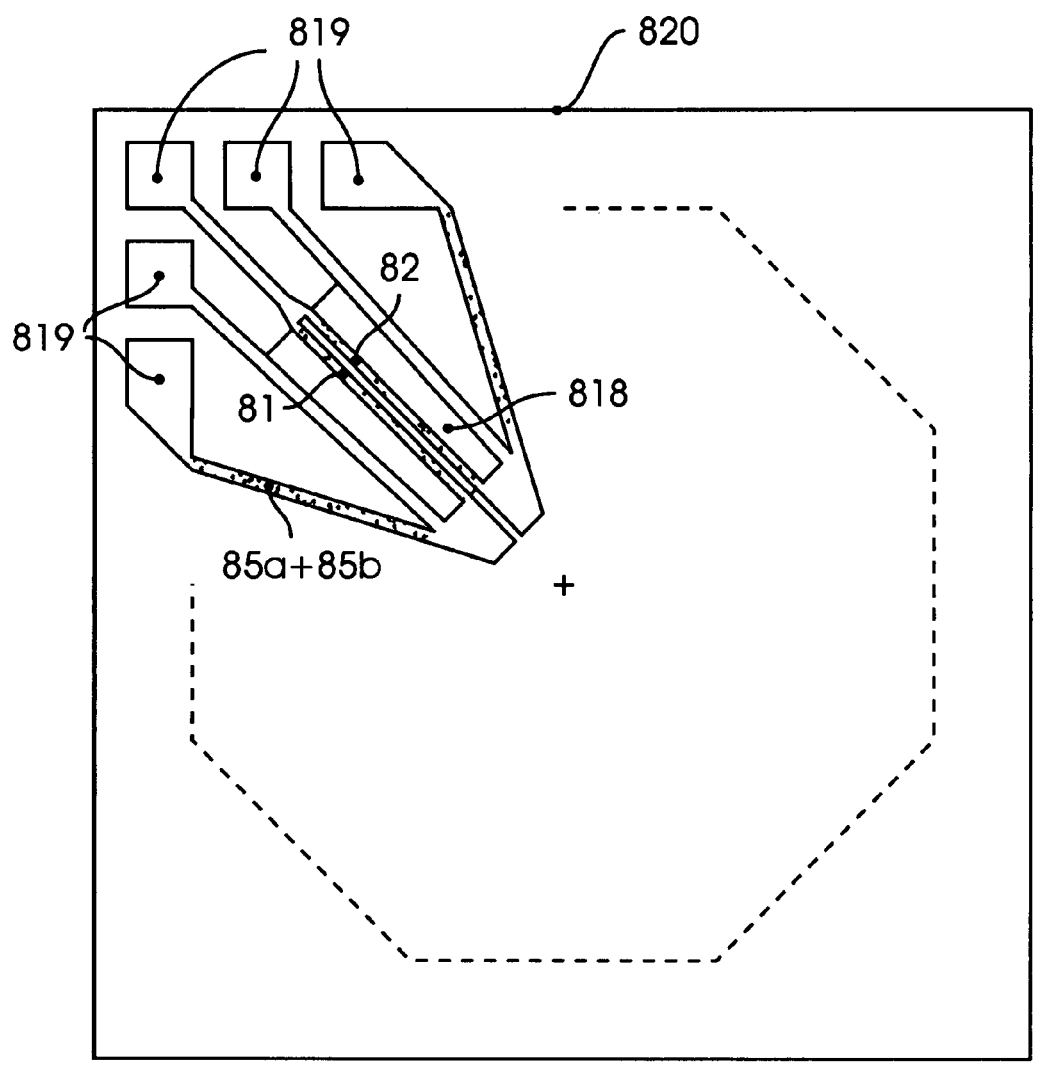
FIG. 8: Exemplary embodiment of a sensor, primarily to detect rotational movement.

FIG. 8 shows a micromechanical sensor structure suitable for some of the operating modes described.

On the sensor support 820, the measuring arrangement shown is grouped radially around the center of the support in a fourfold arrangement.

81 and 82 are heaters (transmitters) or sensors (receivers) which, for example, correspond to 51 and 52 in FIG. 5 or 61 and 62 in FIG. 6a, 6b or 71 and 72 in FIG. 7, these both being temperature-dependent here. These transmitter or receiver crosspieces are preferably located in a cantilever fashion over the opening 818.

The resistances 84a and 84b as well as 85a and 85b (with the same width, the same thickness, the same temperature coefficient but longer than the transmitter-receiver 71 and 72) are connected thermally fixedly to the support (chip substrate) 820. These correspond, for example, to 54a and 54b in FIG. 5 or 64a and 64b in FIG. 6 or 74a and 74b, as well as 75a and 75b in FIG. 7.

The transmitter-receivers and the reference resistances 84, 85 are connected to the connections (bondpads) 819 by means of highly conducting connecting leads.

Since transmitter/receivers are arranged closely adjacent to one another, short transit times are obtained. Thus, extremely small variations, especially during rotational accelerations, can be detected rapidly.

Figure 9:
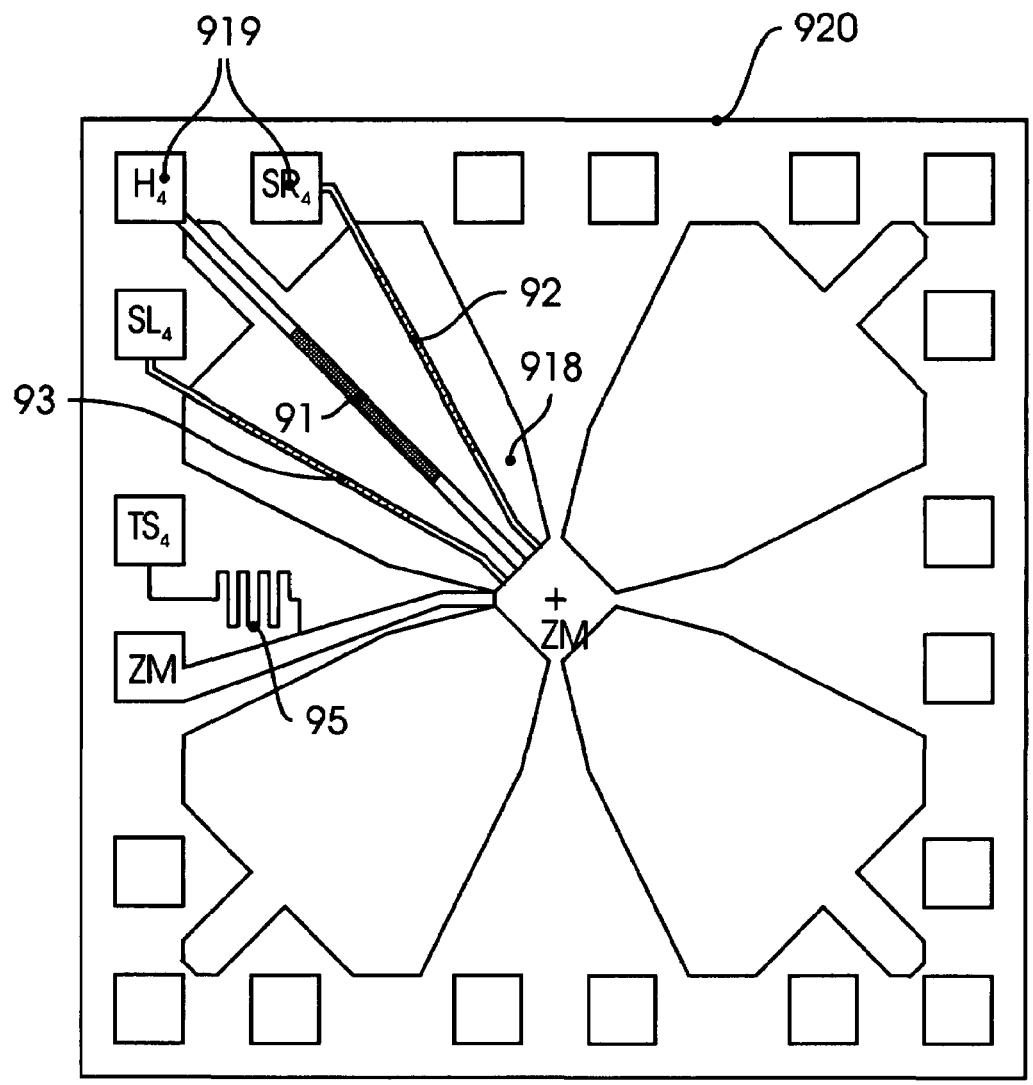
FIG. 9: Exemplary embodiment of a sensor with 4 transmitters and 8 receivers, assembled radially.

FIG. 9 shows a similar micromechanical structure to FIG. 8 but one transmitter (91) is located centrally between two receivers (92 and 93). Transmitters and receivers are preferably arranged in a cantilever fashion over the opening 918. The arrangement is again grouped radially around the center of the support in a fourfold arrangement.

The receivers are temperature-dependent, preferably having the same temperature coefficient as the reference resistance 95 which is thermally connected to the support in a good conducting fashion.

The radial alignment of the transmitter and receiver crosspieces shown is selected so that when used as a rotation rate sensor, wave crests generated by the transmitter are incident approximately at the same time over the entire extent of the receiver if the receiver is moved towards or away from the wave crest at a certain angular velocity.

The structure shown (9) is suitable, for example, for the operating mode according to FIGS. 4 and 6c.

Figure 10:
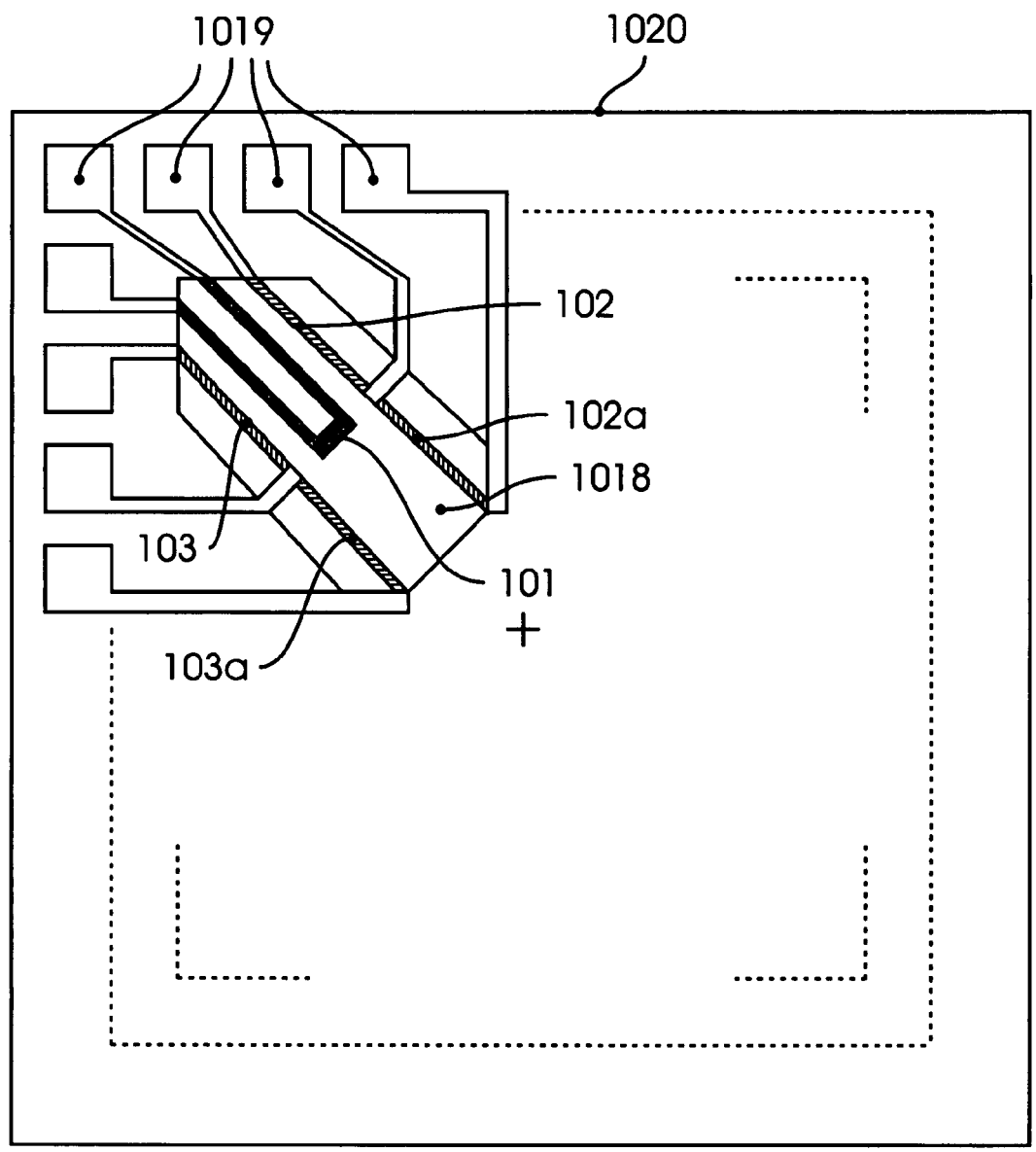
FIG. 10: As above, but with receivers, which have a connection in the middle.

In FIG. 10 the heater crosspiece (transmitter) 101 only extends over an area radially further distant from the central point than the sensor (receiver) combination 102/102a and 103/103a. Reference resistances (like resistance 95 from FIG. 9) are likewise present but are not shown for better clarity.

Measuring bridges 44, 45 and amplifiers 411a and 411b as in FIG. 4 are used for this structure, twice for 102 and 103 as well as 102a and 103a, separately, but only one microcontroller with four inputs as well as only one source 413 and only one heater (transmitter) 101, corresponding to 41.

The heater (transmitter) 101 is cyclically activated and thus generates a density fluctuation (thermal wave) whose average has a certain temperature difference from the ambient temperature of the support.

If the arrangement 1020 is set in rotation about the central point, the receivers 102 and 103 initially detect the rotational acceleration and its direction. The receivers 102a and 103a are further removed from the transmitter. The thermal wave will therefore impinge after a longer transit time and be flattened.

During continuous rotation (e.g. at constant rotation rate) the zone of increased (average) temperature level is displaced radially towards the central point of the support (axis of rotation z) by centrifugal force. The ratio of the transit times 101-102 to 101-102a and 101-103 to 101-103a is shifted accordingly. In this way, additional information can be obtained to distinguish angular momentum/rotation rate.

Figure 11:
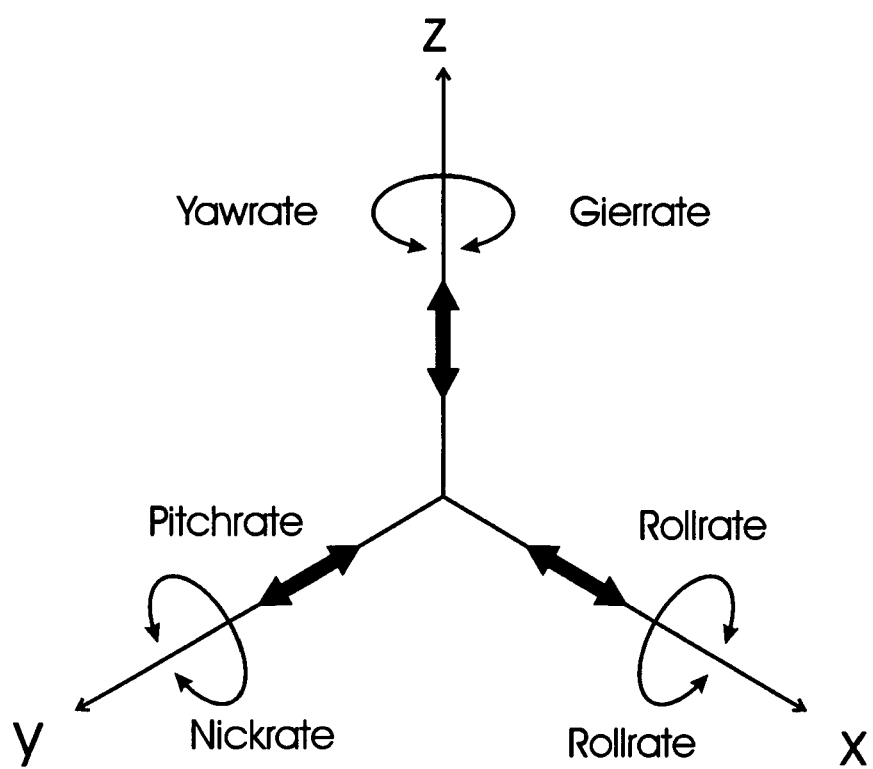
FIG. 11: Embodiment of the possible measurement-axes.

So far, sensors have been described for one or two axes (x, y) as well as for rotation about z. However, with the operating modes according to the invention involving evaluation of transit time or frequency or phase shift of density fluctuations it is also possible to build triaxial sensors on a single support which can detect both position and linear movements in the direction of the x, y, z axes and also pitch, roll and yaw rate (see FIG. 11).

A single suitably constructed sensor can thus take on the tasks of a so-called "inertial measurement cluster (IMC)".

Figure 12:
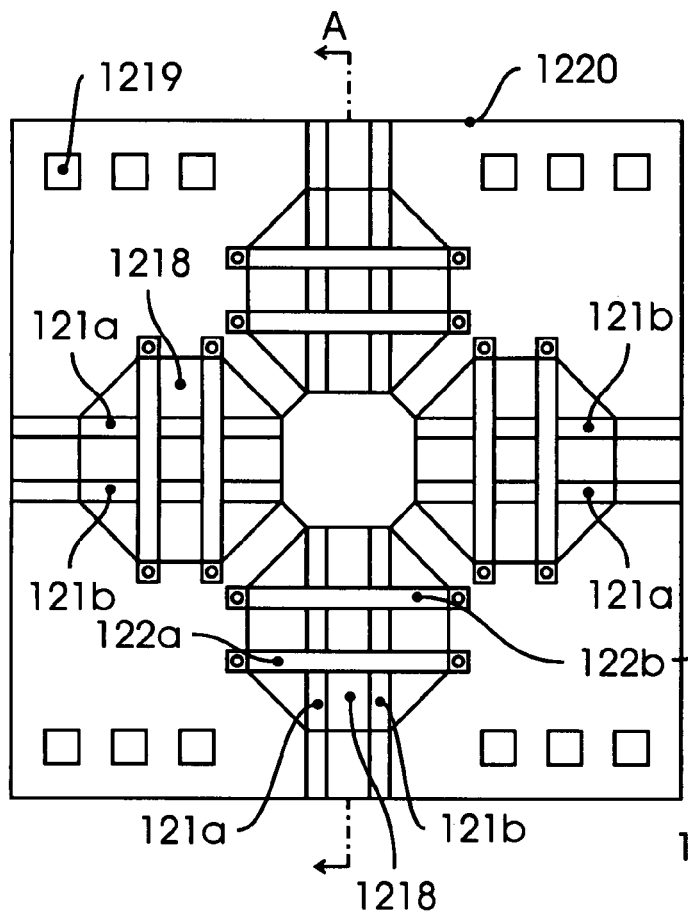
FIG. 12: Exemplary embodiment of a sensor with transmitters and receivers arranged in 2 plains.
Figure 12:
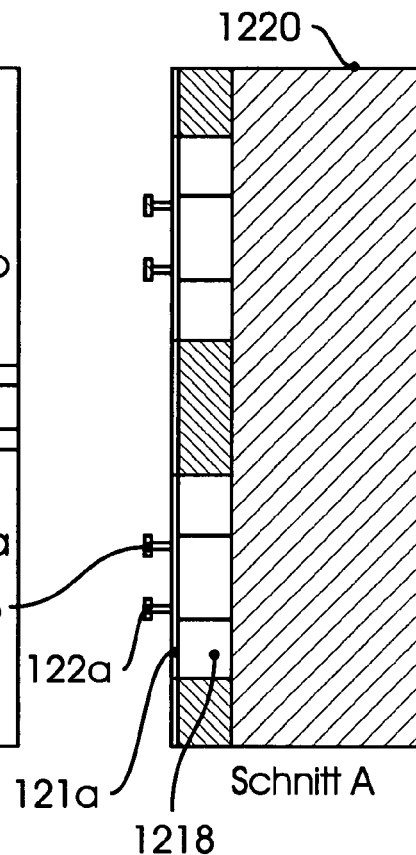
Figure 12:
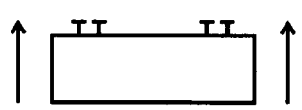
Figure 12:
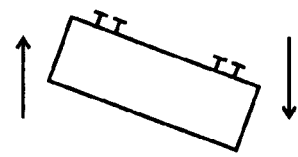

FIGS. 12a,b shows an exemplary embodiment of such a sensor, in this case again initially using thermal excitation (transmitter).

Groups of dual-function crosspieces (transmitter and receiver at the same time) 121a and 121b are arranged, for example, radially in a fourfold arrangement, on the surface of a support (e.g. silicon substrate) 1220. These are preferably located in a cantilever fashion over openings 1218 (e.g. freely etched).

The transmitter/receiver crosspieces 122a and 122b are "placed upright" crosswise to the transmitter/receiver crosspieces 121a and 121b spaced from the surface of the support by means of supports.

Leads from transmitters and receivers to the connections (bondpads) 1219 are not shown for the sake of clarity.

The four groups of dual-function crosspieces 121a and 121b can in principle detect position and movement in the x and y axis as well as rotation about z in one of the previously described operating modes.

The density fluctuations generated at one crosspiece 121a or 121b or at both crosspieces however also propagate in the z axis in the direction of the transmitter-receiver crosspieces 122a and 122b. The transit time in this direction is also influenced by the acceleration due to gravity. Movements in the z axis are added or subtracted from g and result in corresponding transit-time differences.

In one operating mode according to circuit 4, crosspiece 121a can correspond to the transmitter 41, for example; 121b is receiver 42 and 122a arranged thereabove in the z direction corresponds to receiver 43.

A first measurement cycle yields the two transit times 121a-121b and 121a-122a. If 121b is thereafter switched as transmitter 41, 121a as receiver 42 and 122b as receiver 43 in a second cycle, the transit times will then only be the same as those in the first cycle if the support is horizontally at rest.

If these cycles are executed, for example, in a revolving fashion using the further radial arrangements (three in this case), 4×4 transit times are obtained after a complete revolution.

The difference between the totals of four transit times in the left direction and four transit times in the right direction about z is a measure for the rotation about z.

If the total of the transit times 121a to 121b and of the transit times 121b to 121a of the diametrically opposite arrangement is compared with the total of the transit times in the respective opposite direction, a measure is obtained for the inclination of the axis in which these two arrangements are located.

The transit time 121a or 121a in the direction 122a or 122b can be compared with a transit time value which images the geometry (transmitter-receiver distance) and the acceleration due to gravity in the horizontal rest state and which is fixedly stored in the microcontroller.

If a movement of the entire support takes place in the z axis, as shown in 12c, the transit times in all four arrangements located on the support will vary in phase compared with the stored value.

A tilting movement as shown in 12d on the other hand results in oppositely directed variations in opposing arrangements.

Figure 13:
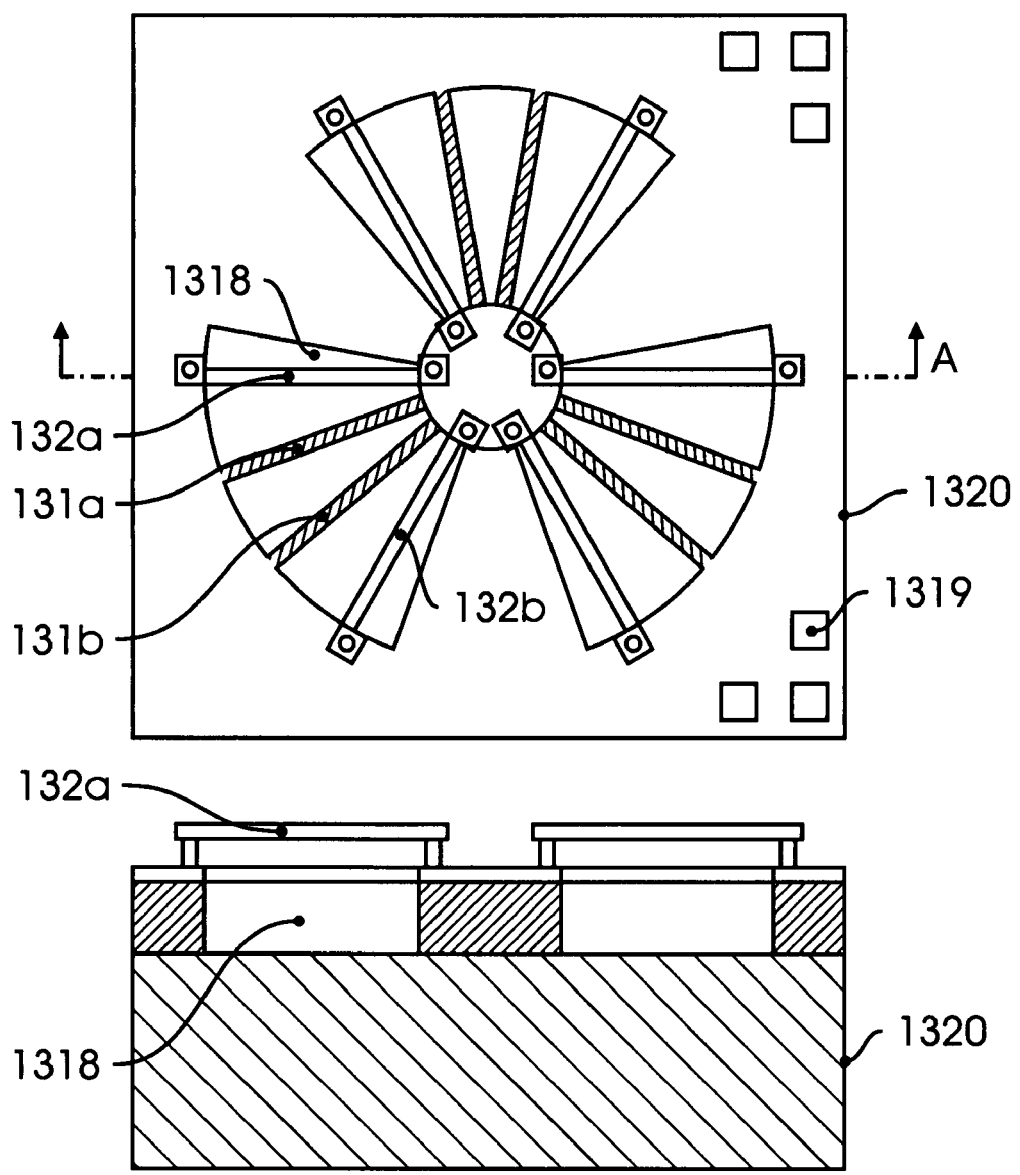
FIG. 13: Exemplary embodiment of a sensor with radially distributed transmitters and receivers in 2 plains.

A similar sensor but with only three radial arrangements is shown in FIG. 13. Located on the surface of the support 1320 are self-supporting transmitters 131a and 131b, and spaced obliquely at an angle therefrom and "placed upright" on supports over the surface are the receivers 1321 and 132b.

The cavity 1318 can be defined for each of the three arrangements or it can also be circularly continuous for example.

Leads from transmitters and receivers to the connections (bondpads) 1319 are not shown for the sake of clarity.

In this arrangement it is possible, for example, to combine either 131a and 132a as well as 131b and 132b respectively to form a transmitter-receiver pair or 131b and 132a as well as 131a and 132b.

This can be appropriate for switching over the measurement range. If the pair switching is cyclic, a larger measurement range can be covered with improved accuracy. This sensor structure is fundamentally suitable for all the operating variants described.

According to the invention, a combination of already known and published methods is proposed for the manufacture of these sensors.

Figure 14:
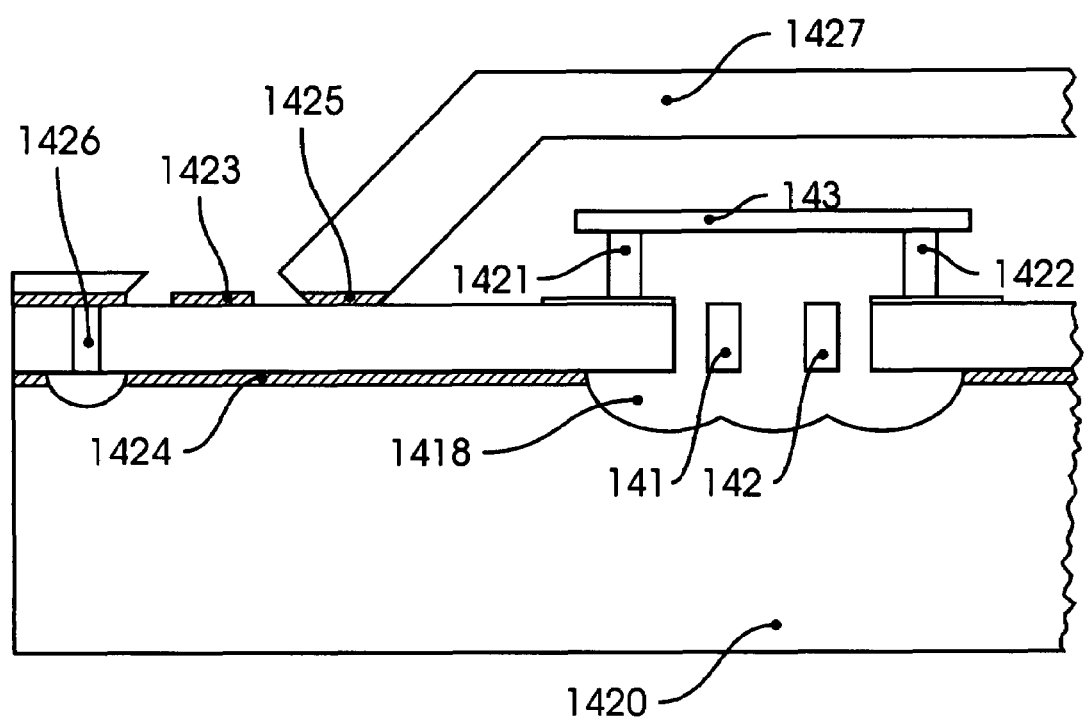
FIG. 14: Detailed view of an exemplary embodiment of a position and movement sensor in 2 plains with encapsulation.

FIG. 14 shows a section through a sensor structure on a silicon substrate 1420 (e.g. SOI wafer). Crosspieces 141 and 142 which are self-supporting or arranged on thin membrane over the depth etching 1418 serve as transmitter and/or receiver in the x/y plane. The supports 1421 and 1422 (produced by metal separation for example) carry transmitters and/or receivers 143. This "bridge" is arranged above the crosspieces 141 and 142 and is distant from these in the z direction.

Transmitters and receivers are conductingly connected with bondpads 1423. Oxide layers 1424, 1425 etc. or parting lines 1426 are used for electrical insulation. A closure cap 1427 (silicon, glass etc.) is optionally applied hermetically sealed in a wafer bond method and encloses the fluid or the fluids having suitable composition and preselected pressure together with the density fluctuation transmitters and receivers.

Figure 15:
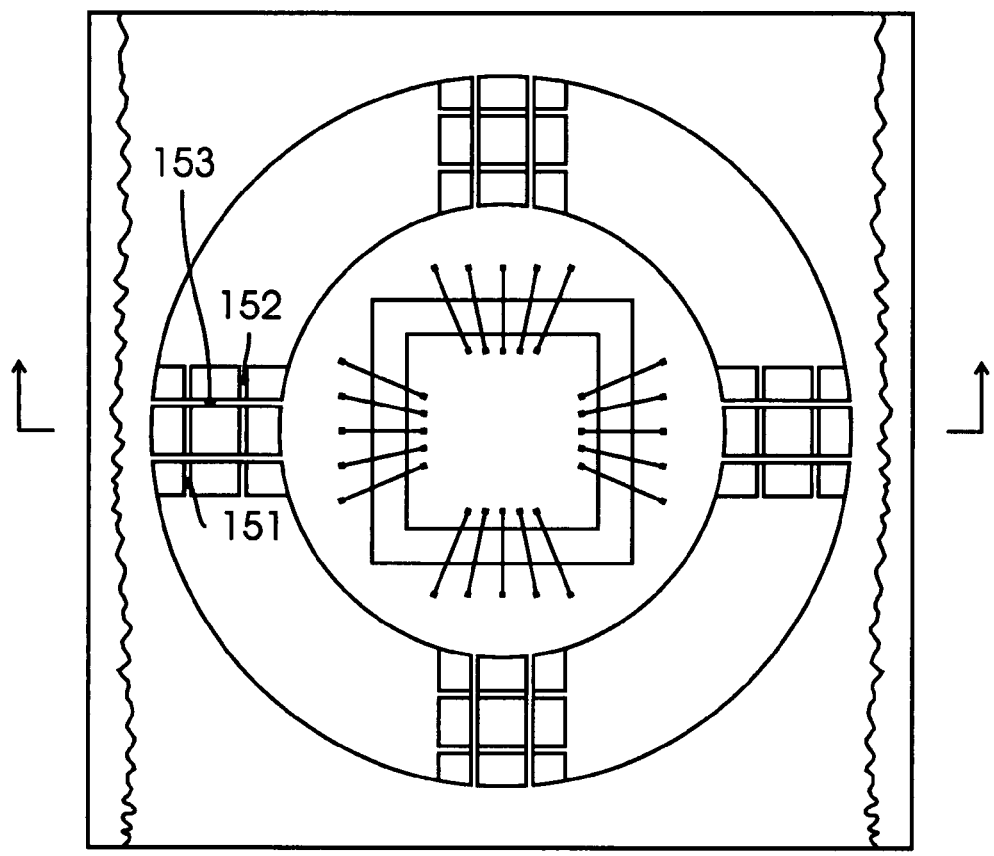
FIG. 15: Exemplary embodiment of a sensor in hybrid-assembling.
Figure 15:
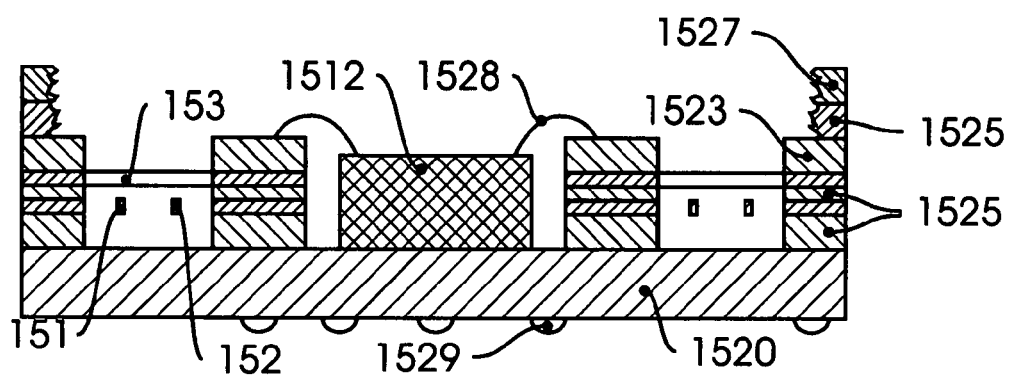

FIG. 15 shows a sensor structure using mixed technology. A thin layer with exposed transmitters/receivers 151 and 152 is applied to a first spacer layer 1525 on a support, another spacer layer 1525 thereabove, and another thin layer with exposed transmitters/receivers 153 thereabove. Located thereabove is a further layer 1523 which contains the necessary continuous bonding in the same way as the lower layers in order to connect the transmitters and receivers with the evaluation electronics on the chip 1512 and these in turn to the external connections (e.g. ball-grid array).

The internal connection between the transmitter, receiver and external connections which are guided out onto the layer 1523 by continuous bonding is made by bondwires 1528. A further spacer layer 1525 is followed by a closure cover 1527 which is applied in an atmosphere with the provided fluid or fluid mixture at desired pressure.

Both the support and also the further layers and films up to and including 1523 are preferably made of a material, for example, glass ceramic (LTCC, HTCC) of corresponding thickness and after screen printing and manufacturing the continuous bonding, are laminated together using known methods. After the sintering process, the evaluation chips are bonded in and optionally the fluid is enclosed by a cover 1527 on spacer layer 1525.

Figure 16A:
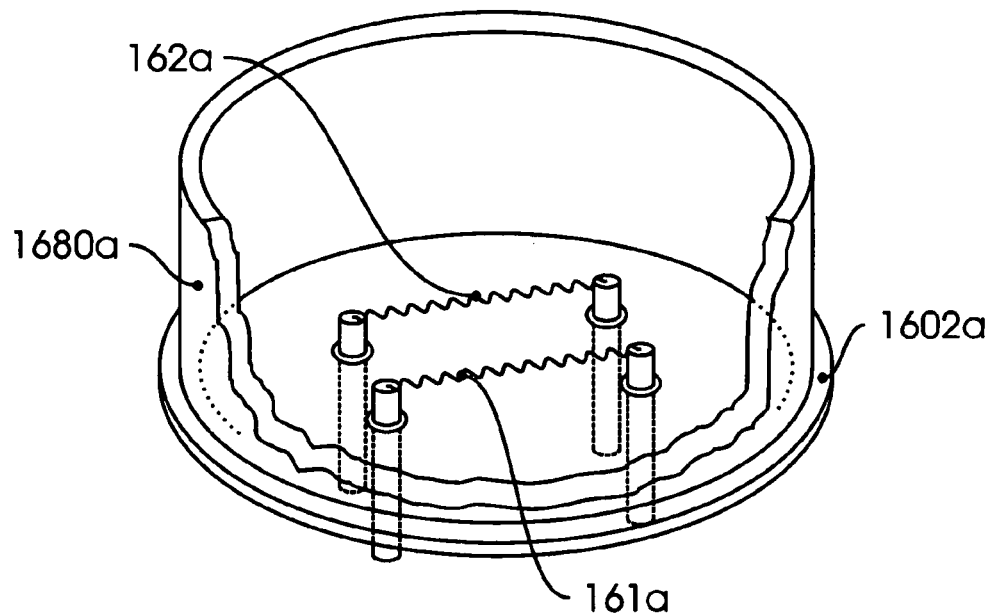
FIG. 16: Exemplary embodiments of sensor-assemblies with open capsule to detect fluid properties.

FIG. 16*a* shows a sensor having an open capsule.

Transmitters 161*a* and receivers 162*a*, for example, in the form of thin tungsten coils are applied to a support 1602*a*, spaced and insulated. Such an arrangement is known from DE 19903010 A1 ("Pirani pressure measuring arrangement and combination sensor . . . ). The capsule 1680*a* is open so that transmitter and receiver can enclose the fluid to be measured. The "capsule" can be executed, for example, in the form of a suitable connecting fitting on a fluid container (flange, pipe etc.).

If the arrangement is operated according to one of the previously described methods, for example, according to FIG. 5 or 7, information on the pressure and composition of the measuring fluid can be obtained from frequency, phase shift and amplitude values. At higher pressures changes in the heat capacity of the fluid are dominant whereas at lower pressures as far as medium-high or high vacuum, the thermal conductivity varies substantially.

Figure 16B:
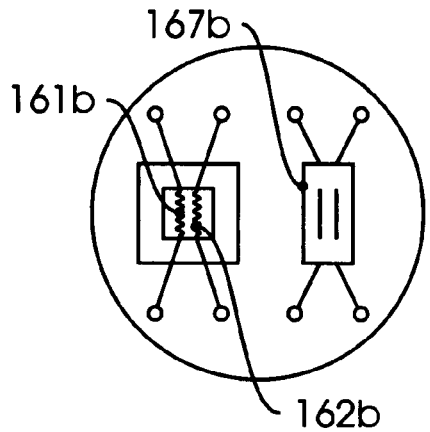

FIG. 16*b* shows a combination sensor arrangement which, similarly to the combination known from DE 19903010 A1 (FIGS. 2 and 3 therein), in addition to the density fluctuation transmitter 161*b* and receiver 162*b*, has a piezoresistive or capacitive pressure sensor 167*b*.

Figure 16C:
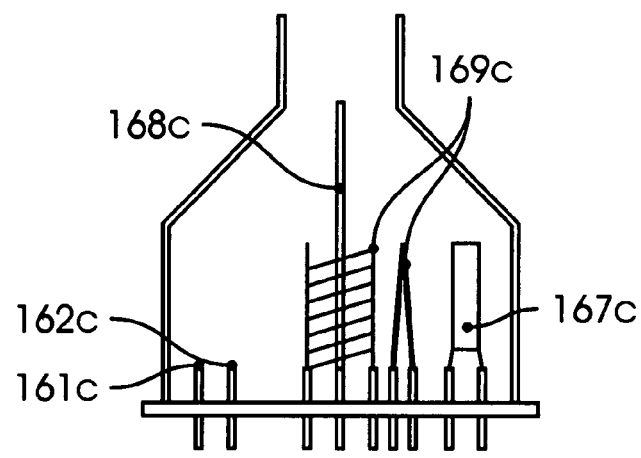

FIG. 16*c* shows a combination sensor arrangement which, similarly to the combination known from DE 19903010 A1 (FIG. 4 therein), in addition to the density fluctuation transmitter 161*c* and receiver 162*c*, has a piezoresistive or capacitive pressure sensor 167*c* and an electrode structure for vacuum measurement according to the cold cathode principle 168*c* or the hot cathode principle 169*c*.

Instead of or in addition to the additional elements described in FIGS. 16*a* to 16*c*, other electronic components such as, for example, photoelectric transmitters, infrared transmitters and receivers, Pirani sensors and others can also be combined.

What is claimed is:

1. A sensor, comprising a closed container which encloses at least one transmitter and at least one receiver and a fluid, wherein the at least one transmitter generates cyclic fluid density fluctuations and the at least one receiver detects at least one of a change in transit time, a phase shift, a frequency change, and an amplitude change, and wherein at least one of the sensor's movement, acceleration, and position are determined based on at least one of the detected change in transit time, phase shift, frequency change, and amplitude change.

2. The sensor according to claim 1, wherein the container contains at least two different fluids.

3. The sensor according to claim 1, wherein the container contains one fluid which has magnetic properties.

4. The sensor according to any one of claims 1, 2 or 3, wherein a freerunning density oscillation is formed by feedback from the at least one receiver to the transmitter, based on one of principles of a density wave oscillator and thermal oscillator.

5. The sensor according to claim 4, wherein the at least one transmitter and the at least one receiver have the same type of structure and cyclically change their function from the at least one transmitter to the receiver and conversely according to one of the principles of a "thermal oscillator" or a "density wave oscillator".

6. The sensor according to claim 1, wherein the container contains at least two different fluids of which one has magnetic properties.

7. The sensor according to claim 1, wherein the at least one transmitter and the at least one receiver are arranged on thin membranes.

8. The sensor according to claim 1, wherein the least one transmitter, the at least one receiver, or both are made of glass ceramic material.

* * * * *